(12) United States Patent
Rasset et al.

(10) Patent No.: US 7,909,349 B2
(45) Date of Patent: Mar. 22, 2011

(54) METHOD AND ASSEMBLY FOR DRAWBAR RETENTION

(75) Inventors: John T. Rasset, Barnesville, MN (US); Russell Victor Stoltman, Argusville, ND (US)

(73) Assignee: CNH America LLC, New Holland, PA (US)

( * ) Notice: Subject to any disclaimer, the term of this patent is extended or adjusted under 35 U.S.C. 154(b) by 280 days.

(21) Appl. No.: 12/214,646

(22) Filed: Jun. 20, 2008

(65) Prior Publication Data

US 2009/0315298 A1 Dec. 24, 2009

(51) Int. Cl.
*B60D 1/02* (2006.01)
*B60D 1/36* (2006.01)

(52) U.S. Cl. .............. 280/462; 280/478.1; 280/499; 280/515

(58) Field of Classification Search .......... 280/408, 280/410, 478.1, 479.2, 467, 499, 515, 462, 280/479.1; 172/248
See application file for complete search history.

(56) References Cited

U.S. PATENT DOCUMENTS

| | | | |
|---|---|---|---|
| 1,877,579 A | 9/1932 | Paul | |
| 2,092,597 A * | 9/1937 | Benjamin et al. | 280/447 |
| 2,462,726 A * | 2/1949 | Currie | 280/499 |
| 2,506,773 A | 5/1950 | Bunting | |
| 2,890,896 A * | 6/1959 | Hendrickson | 280/467 |
| 2,947,551 A | 8/1960 | Reimers | |
| 3,243,200 A | 3/1966 | Roenfeldt | |
| 3,498,637 A * | 3/1970 | Lemmon | 280/468 |
| 3,677,565 A | 7/1972 | Slosiarek | |
| 3,795,415 A | 3/1974 | Koch et al. | |
| 4,398,617 A * | 8/1983 | Crabb et al. | 180/235 |
| 4,420,169 A | 12/1983 | Taylor | |
| 4,650,207 A * | 3/1987 | Ackermann | 280/515 |
| 5,201,539 A | 4/1993 | Mayfield | |
| 5,217,242 A | 6/1993 | Thomas et al. | |
| 6,170,852 B1 * | 1/2001 | Kimbrough | 280/479.2 |
| 6,588,513 B1 | 7/2003 | Gustafson | |
| 6,749,213 B2 | 6/2004 | Kollath et al. | |
| 6,766,867 B1 | 7/2004 | Harting et al. | |
| 6,776,432 B2 | 8/2004 | Harkcom et al. | |
| 6,959,942 B2 | 11/2005 | Lippons et al. | |
| 7,625,003 B2 * | 12/2009 | Tveito et al. | 280/515 |

FOREIGN PATENT DOCUMENTS

WO WO-0107273 2/2001

\* cited by examiner

*Primary Examiner* — Anne Mrie M Boehler
(74) *Attorney, Agent, or Firm* — Patrick M. Sheldrake; Michael G. Harms

(57) ABSTRACT

An assembly for drawbar retention from a hanger bar on the rear of a tractor includes bottom and top capture plates spanning the intersection of the drawbar and hanger bar, front to back and side to side, and held together by four bolt and nut fasteners that are passed vertically through the four corners of the two plates such that there are two bolts on either lateral side of the drawbar and two on the front and back sides of the hanger bar. A pair of spacer blocks are provided across the front and back edges of the hanger bar releasably captured between the cover plates by the bolts. Cutouts in the spacer blocks can receive tongues on wear pads to permit pads to be captured between the top cover plate and hanger and/or the hanger and the drawbar by the bolts and spacers. The method is the arrangement of top and bottom cover plates with spacers and fasteners as stated, with or without wear pads.

12 Claims, 4 Drawing Sheets

PRIOR ART

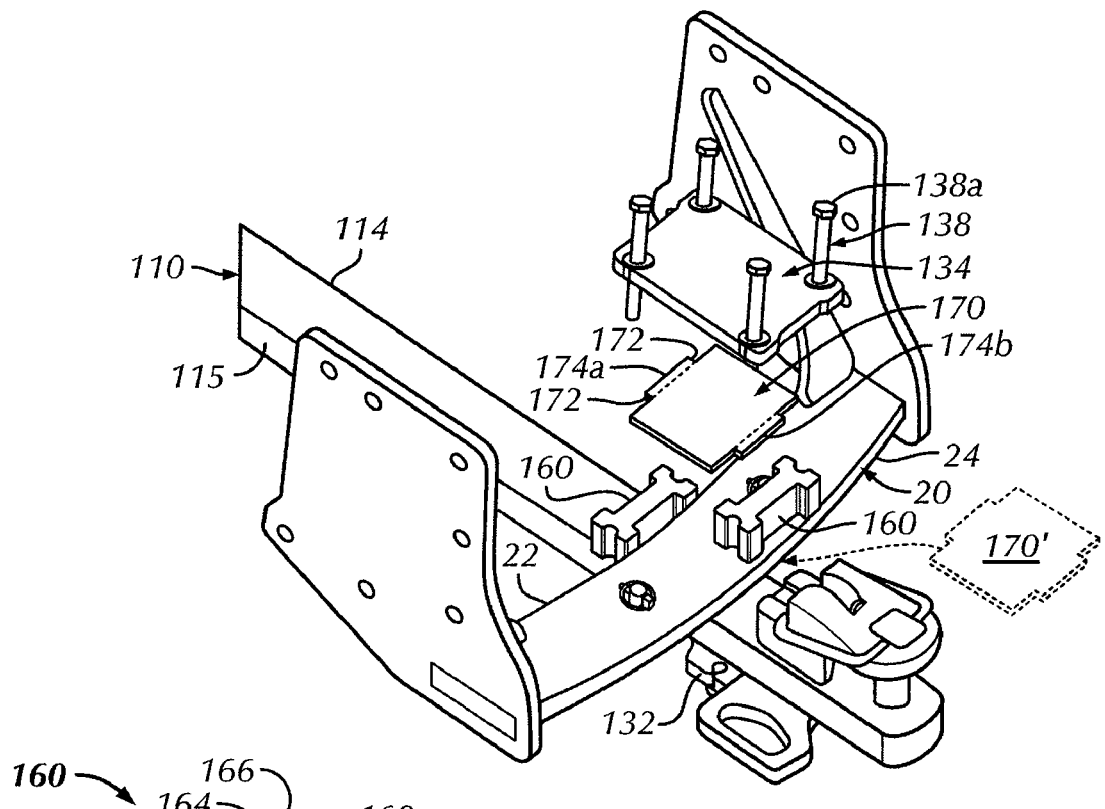
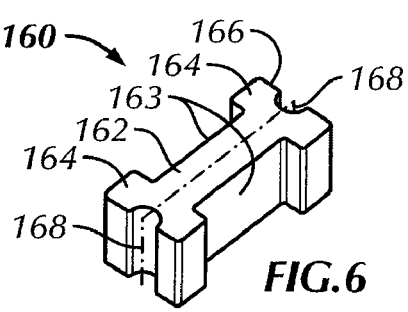
FIG.6
FIG.4
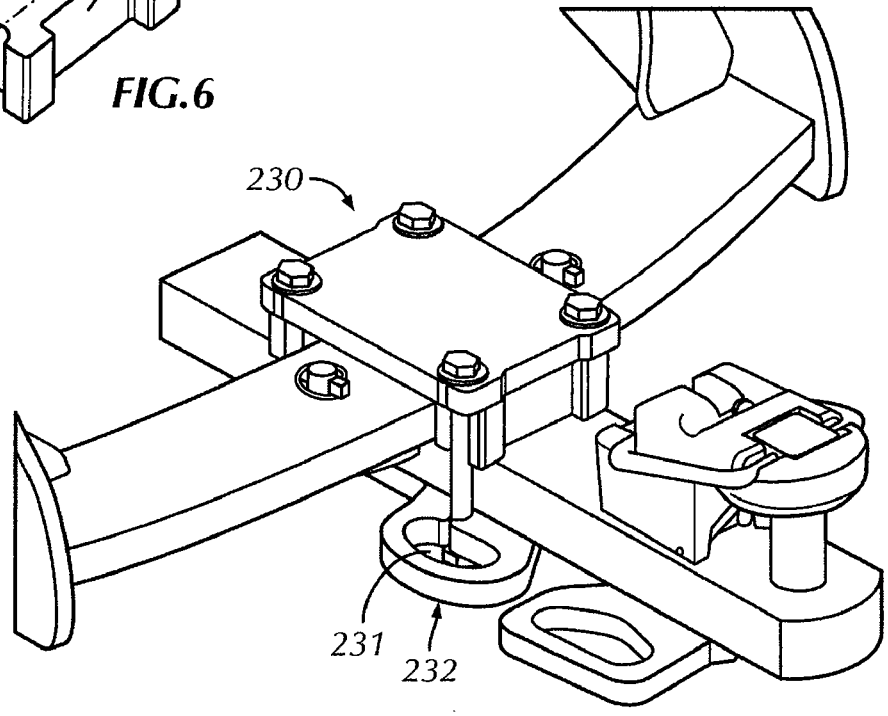
FIG.5

METHOD AND ASSEMBLY FOR DRAWBAR RETENTION

BACKGROUND OF THE INVENTION

The present invention relates to drawbars and, more particularly, to swinging drawbars commonly used with agricultural tractors The use of swinging drawbars used with agricultural tractors are well known. In some applications, lateral movement of the drawbar under load is desirable. In other applications, lateral movement of the drawbar is undesirable and the drawbar must be retained.

FIG. 1 depicts a current and therefore prior art method of and device for retaining a swinging drawbar in a stationary position. A telescoping drawbar 10 is suspended from a hanger bar 20 fixedly attached to the rear end 52 of an agricultural tractor 50 by an assembly 30 including a U shaped saddle 32, a cover plate 34 and fasteners in the form of a pair of bolts 38. Saddle 32 extends under and around the lateral sides of the drawbar 10. Lateral side walls 32a, 32b of the saddle 32 are notched to define forks extending above front and rear edges 22, 24 of the hanger bar 20 on either lateral side 14, 15 of the drawbar 10 and along the lateral side edges of the cover plate 34. The saddle 32 and cover plate 34 are releasably secured together by the pair of bolts 38. A wear pad 70 is optionally provided between the cover plate 34 and hanger bar 20 to prevent drawbar wear from downloads on the drawbar tongue. The assembly 30 provides sufficient spacing for the drawbar to be pivoted side to side on the hanger bar 20, when desired. The drawbar can be retained in a fixed position by the provision of pins 26 through spaced openings 28 in the hanger bar 20 to as to straddle the drawbar. Mirror images stop members 33 are provided on the lateral side walls 32a, 32b, respectively of the saddle 32 to contact the pins 26. Assembly 30 provides download support of the drawbar 10 when needed while permitting lateral movement of the drawbar 10 along the hanger bar 20. As good as this design is, an improvement over this design would be beneficial.

BRIEF SUMMARY OF THE INVENTION

An assembly for retaining a drawbar on a hanger bar fixedly mounted to a tractor proximal a rear end of the tractor and extending in a generally lateral direction so as to have opposing, elongated, front and rear edges, the assembly comprising: a bottom capture plate configured to be applied to a bottom side of the drawbar extending beyond lateral sides of the drawbar and beyond the front and rear edges of the hanger bar overlying the drawbar; a top capture plate configured to be applied over the hanger bar overlying the drawbar and also sized to extend beyond lateral sides of the drawbar and beyond the front and rear edges of the hanger bar; at least four removable fasteners extending between the top and bottom capture plates to secure the top and bottom capture plates together spanning intersection of the draw bar and overlying hanger bar, the top and bottom capture plates being configured to receive two of the fasteners on each lateral side of the drawbar and two of the fasteners on either of the front and rear edges of the hanger bar; and first and second spacer blocks configured to be removably captured along the front and rear edges of the hanger bar between the top and bottom capture plates by separate pairs of the at least four fasteners, the spacer blocks having a height greater than a height of the hanger bar.

In another aspect, the invention is a drawbar mounting on a tractor comprising: a drawbar pivotally supported from the tractor for lateral movement at a rear end of the tractor; a hanger bar fixed mounting to the tractor proximal the rear end overlying the drawbar, the hanger bar having opposing, elongated front and rear edges; a bottom capture plate applied to a bottom side of the drawbar extending beyond lateral sides of the drawbar and beyond the front and rear edges of the hanger bar overlying the drawbar at an intersection of the drawbar and the hanger bar; a top capture plate applied over the intersection of the drawbar and the hanger bar overlying the drawbar and also sized to extend beyond lateral sides of the drawbar and beyond the front and rear edges of the hanger bar; at least four removable fasteners extending between the top and bottom capture plates to secure the top and bottom capture plates together spanning the intersection of the drawbar and overlying hanger bar, the top and bottom capture plates being receiving two of the fasteners on each lateral side of the drawbar and two of the fasteners on either of the front and rear edges of the hanger bar; and first and second spacer blocks removably captured along the front and rear edges of the hanger bar between the top and bottom capture plates by separate pairs of the at least four fasteners, the spacer blocks having a height greater than a height of the hanger bar.

In yet another aspect, the invention is a method of retaining a drawbar pivotally mounted to a tractor on a hanger bar fixedly mounted to the tractor overlying the drawbar, the method comprising the steps of: positioning top and bottom capture plates respectively over and under the overlapped drawbar and hanger bar at an intersection of the drawbar and hanger bar so as to overlap opposing front and rear edges of the hanger bar and lateral sides of the drawbar; positioning first and second spacer blocks separately along the front and rear edges of the hanger bar between the top and bottom capture plates, the spacer blocks having a height greater than a height of the hanger bar; and removably securing the top and bottom capture plates over and under the overlapped draw bar and hanger bar, respectively and the first and spacer bars along the front and rear edges of the hanger bar with at least four fasteners extended between and through the top and bottom capture plates.

BRIEF DESCRIPTION OF THE DRAWINGS

FIG. 4 is a partially exploded view of the embodiment of FIGS. 2-3;

FIG. 5 is a top and rear perspective view of a second embodiment of the present invention;

FIG. 6 depicts a spacer block;

DETAILED DESCRIPTION OF THE INVENTION

Figure 1:
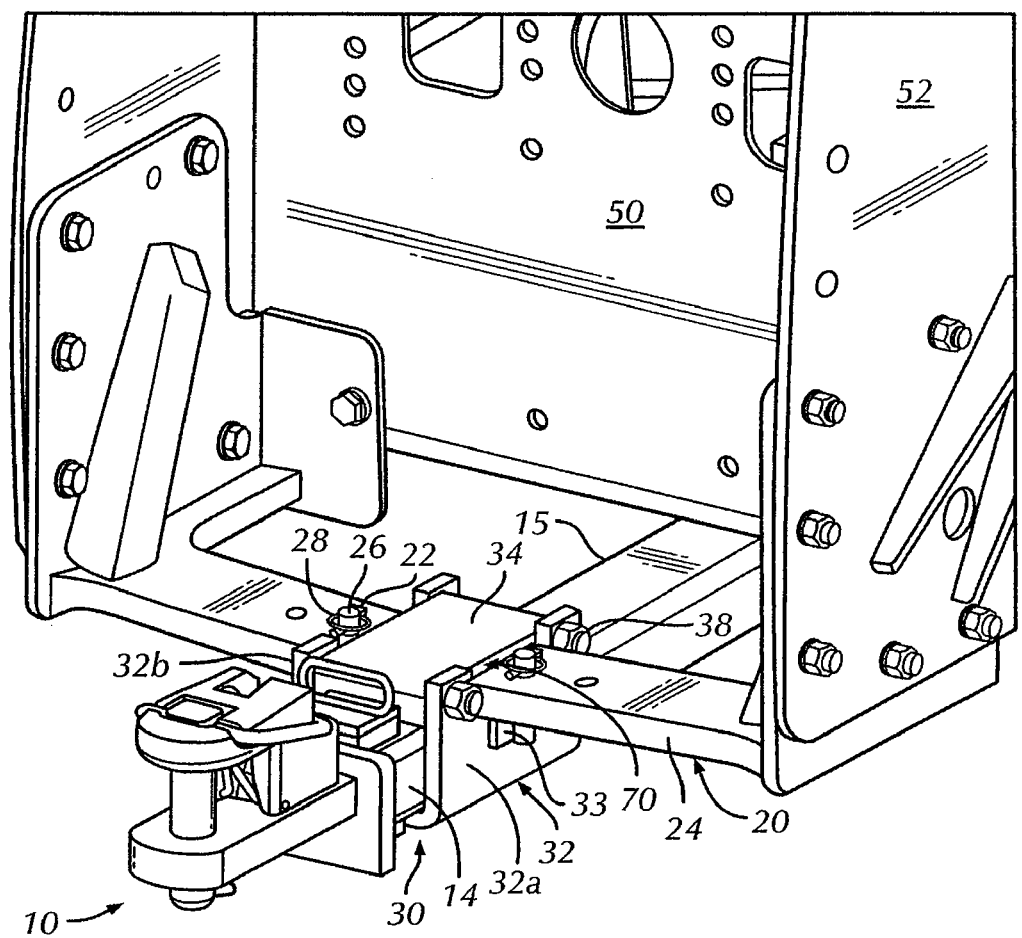
FIG. 1 is a partial perspective view of a prior art drawbar and hanger bar combination.

Like reference numerals are used to indicate like elements in the various embodiments. The same numbers are used to identify identical elements in the various embodiments.

Figure 2:
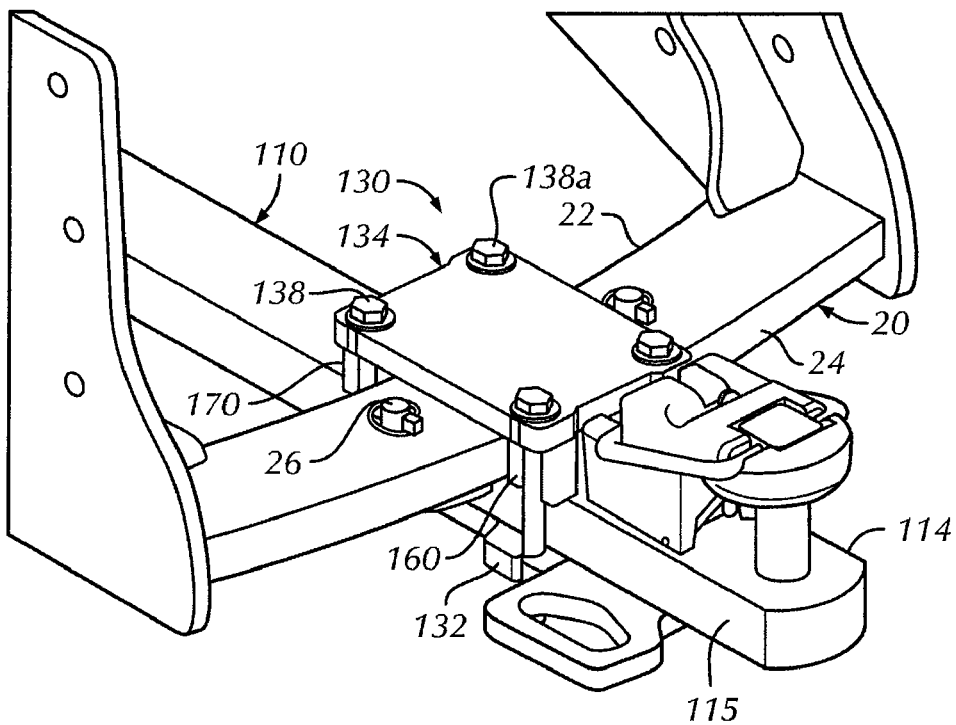
FIG. 2 is a top and rear perspective view of a first embodiment of the present invention.
Figure 3:
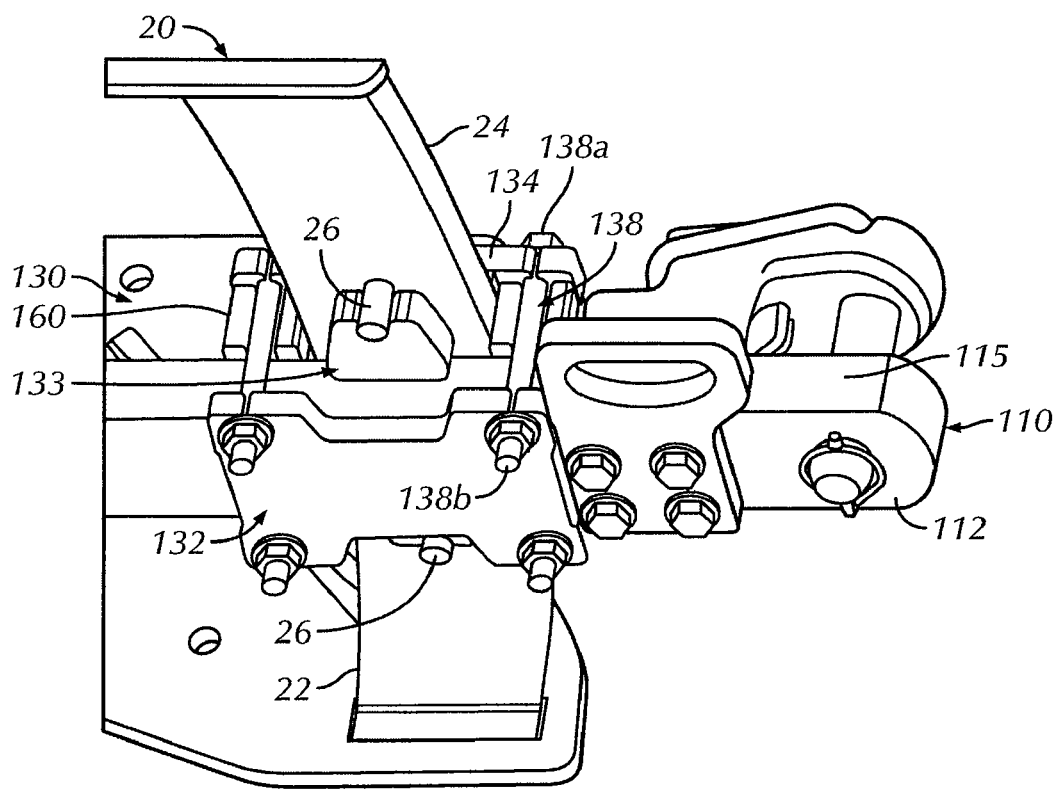
FIG. 3 is a bottom and rear perspective view of the embodiment of FIG. 2.

FIGS. 2-4 depict a first embodiment method and assembly for retaining a drawbar 110 on a tractor like agricultural tractor 50 partially depicted in FIG. 1. Unlike drawbar 10, which is a bar into tube assembly, drawbar 110 is simply a solid bar. A forward end of drawbar 110 is pivotally connected to the chassis of the tractor 50 in a conventional fashion (not depicted) for side to side lateral movement at the rear end 52 of the tractor 50. An assembly of the present invention for retaining the drawbar 110 on hanger bar 20 is indicated generally at 130. Hanger bar 20 is fixedly mounted to tractor 50 proximal the rear end 52 of the tractor so as to extend in a generally lateral direction across the rear end of the tractor so as to have opposing, elongated, front and rear edges 22, 24, respectively. The assembly 130 comprises a bottom capture plate 132 configured to be applied to a bottom side 112 of the drawbar 110 extending beyond opposing lateral sides 114, 115 of the drawbar 110 and beyond the front and rear edges 22, 24 of the hanger bar 20 overlying the drawbar 110. The assembly 130 further comprises a top capture plate 134 likewise configured to be applied over the hanger bar 20 overlying the drawbar 110 and also sized to extend beyond lateral sides 114, 115 of the drawbar 110 and beyond the front and rear edges 22, 24 of the hanger bar 20. The assembly 130 further comprises at least four removable fasteners 138, preferably M20 grade bolts 138a, extending between the bottom and top capture plates 132, 134 and joined with similar grade nuts 138b to secure the bottom and top capture plates 132, 134 together spanning the intersection of the drawbar and overlying hanger bar. As can be seen in the figures, the top capture plate 134 is generally rectangular with radiused corners. The bottom cover plate 132 is of a more generally rectangular configuration in that opposing sides have mirror image cutouts. Both plates are sized such that the corners of the plates 132, 134 extend beyond the intersection of the hanger bar and drawbar on four sides of the intersection. One of the fasteners 138 is passed through the facing corners of the bottom and top cover plates 132, 134 such that the plates receive two of the fasteners on each lateral side 114, 115 of the drawbar 110 and two of the fasteners on either of the front and rear edges 22, 24 of the hanger bar 20.

According to an important aspect of the invention, first and second spacer blocks 160 are configured to be and are removably captured along the front and rear edges 22, 24 of the hanger bar 20 between the bottom and top capture plates 132, 134 by separate pairs of the at least four fasteners 138. The spacer blocks 160 sit on the drawbar 110 against one of the front and rear edges 22, 24 and have a height greater than a height of the hanger bar 20. This greater height allows the drawbar 112 to swing freely on the hanger bar 20 with the stop pins 26 removed. This height may be sufficiently greater to provide spacing to further receive one or more wear pads between the top and bottom capture plates 132, 134, as will be described.

Preferably the spacer blocks 160 are identical as indicated in FIG. 6 and symmetric with respect to a longitudinal central plane 160' so as to be exchangeable and reversible. Preferably, each spacer block 160 is generally dog bone shaped with an elongated central body portion 162 supporting two identical, generally flared, opposing longitudinal ends 164. Each flared end 164 is configured to releasably receive one of the fasteners 138 extended between the top and bottom capture plates 132, 134 by fastener receiving structures 168 that releasably retain the spacer blocks 160 in the assembly 130 with the fasteners 138. Preferably, each flared longitudinal fastener receiving end 164 has an outer perimeter 166 with a dimple formed by a central depression 168 as a fastener receiving structure. The elongated central body portion 162 is sufficiently long to extent along the hanger bar 20 so as to extend the flared ends 164 beyond the lateral sides 114, 115 of the drawbar. The recesses or cutouts 163 provided by the dog bone shape permit either long side of either spacer block 160 to be applied to either edge 22, 24 of the hanger bar without regard to the curvature of the hanger bar 20. They further form recesses that can be used to capture wear pads as will be explained. The structures (depressions) 168 preferably are spaced to closely receive one pair of the fasteners 138 on the side 22 or 24 of the hanger bar 20 along which the spacer block 160 is located in order to releasably capture the spacer blocks 160 in the assembly 130. Note that the depressions 168 depicted are semicircular to closely receive the circular cross-section of bolts 138a of the pair of fasteners 138 but need not be so shaped. For instance, structure 168 could be wedged shaped or configured as a drilled hole with a closed perimeter and without a depression in the outer perimeter of a flared end 164. Nor do the opposing flared ends 164 or the fasteners receiving structures 168 of the same space block 160 need be identical.

Referring to FIG. 4, it can be seen that at least a wear pad 170 can be optionally but preferably supplied for positioning between top capture plate 134 and the top surface of the hanger bar 20 to protect both members 134, 20 from wear as the drawbar 110 and top capture plate 134 are pulled across the hanger bar 20 in use. The wear pad 170 is preferably but not necessarily of a generally rectangular shape and wider than the hanger bar 20 between its front and rear edges 22, 24 and preferably the length of at least the top capture plate 134 in the longitudinal direction of the hanger bar 20. Cutouts 172 are provided at the four corners of the rectangle to define a final cruciform shape depicted. The wear pad 170 can also be viewed as a smaller rectangle that spans the hanger bar front to rear with front and rear tongues 174a, 174b, respectively, that are sized and shaped to extend beyond the front and rear edges 22, 24 of the hanger bar 20 and into recesses 163 defined on the sides of the elongated central body portion 162 of the spacer blocks 160 by the flared longitudinal ends 164. In this configuration, the wear pad 170 is releasably captured between the bottom and top capture plates 132, 134 and, more particularly, between the top capture plate 134 and the hanger bar 20 by the spacer blocks 160 and the four fasteners 138. Wear pad 170 may be of a conventional plastic construction and suggestedly at least 8, more desirably at least 10 and preferably at least 12 mm thick.

If desired, a second wear pad 170' (in phantom), preferably identical in shape to wear pad 170, can be optionally provided between the bottom of the hanger bar 20 and the top of the drawbar 110 and releasably captured in the same way, with our without a separate pad 170 between the upper side of the hanger bar 20 and the top capture plate 134. This pad 170' would be extremely beneficial in those field operations such as certain ripper type operations that can produce relatively high vertical up loads on the drawbar 110.

Since the drawbar 110 will, more often, be downloaded than uploaded, the first wear pad 170 would be suggestedly thicker than the second pad 170' although again, identical pads 170 identically thick can be used with the expectation that in normal use involving different operations, the pad 170 between the hanger bar 20 and the top capture plate 134 might be changed more often than a second pad of equal thickness between the hanger bar and drawbar. It should be appreciated that since the spacer blocks 160 can be easily replaced and exchanged, they can be selected to have a height greater than a height of the hanger bar 20 but also at least as great as and, more desirably, at least slightly greater than a combined height of the hanger bar 20 and any selected wear pads 170, 170' to permit the drawbar 110 to swing sufficiently freely on the hanger bar 20 in those operations calling for that capability when one or more wear pads 170, 170' are also provided.

It will further be appreciated from the foregoing that the invention also entails the method of retaining a drawbar 110 pivotally mounted to a tractor 50 on a hanger bar 20 fixedly mounted to the tractor 50 overlying the drawbar 110 which comprises the steps of: positioning top and bottom capture plates 134, 132 respectively over and under the overlapped drawbar 110 and hanger bar 20 at an intersection of the drawbar 110 and hanger bar 20 so as to overlap opposing front and rear edges 22, 24 of the hanger bar 20 and lateral sides 114, 115 of the drawbar 110; positioning first and second spacer blocks 160 separately along the front and rear edges 22, 24 of the hanger bar 20 between the top and bottom capture plates 134, 132 with the spacer blocks 160 having a height greater than a height of the hanger bar 20, and removably securing the top and bottom capture plates 134, 132 over and under the overlapped drawbar 110 and hanger bar 20, respectively and the first and spacer bars 160 along the front and rear edges 22, 24 of the hanger bar 20 with at least four fasteners 138 extended between and through the top and bottom capture plates 134, 132.

The method may further include in the removably securing step, the step of capturing at least a first, separate wear pad 170, with or without capturing a second, separate wear pad 170', between the top and bottom capture plates 134, 132 with the at least four fasteners 138 where the spacer blocks 160 each have a height at least as great as and more desirably at least slightly greater than a combined height of the hanger bar 20 and any wear pads 170, 170' that are provided.

FIG. 5 depicts a second embodiment assembly 230 of the present invention that differs from the first embodiment only in the configuration of the bottom capture plate. The bottom capture plate 232 of this embodiment is provided with an integrally formed loop 231 to use as an attachment point for small implement safety chains (not depicted). Large safety chains can be wrapped around the hanger bar 20 to either side of the drawbar 110, in a conventional fashion.

The new method and assembly of the present invention offer certain advantages over the prior art method and assembly of FIG. 1. The new design provides four fasteners instead of two and arranges them so as to be loaded in tension rather than sheer thereby increasing strength. The new design further provides better reinforcement of the intersecting drawbar 110 and hanger bar 20 due to adjustable spacing between the bottom and top cover plates 132, 134 with the fasteners 138 arranged to extend between the plates. Also, the new design positions stop elements 133 directly on the lateral sides 114, 115 of the drawbar 110. The prior art design of FIG. 1 provided stop elements 33 on the lateral sides 32a, 32b of the saddle 32. It was found that banging of the stop elements 33 on the saddle 32 in use caused loosening of the fasteners 38. Stop members 133 can be provided in a variety of ways.

Figure 7:
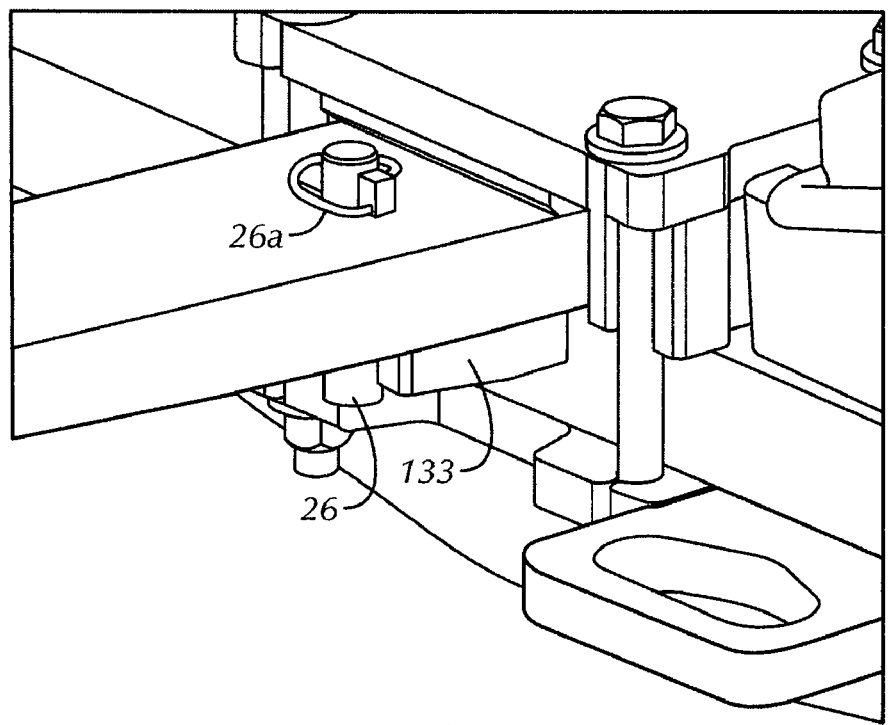
FIG. 7 is a close-up perspective view of the removable stop element configuration.
Figure 8:
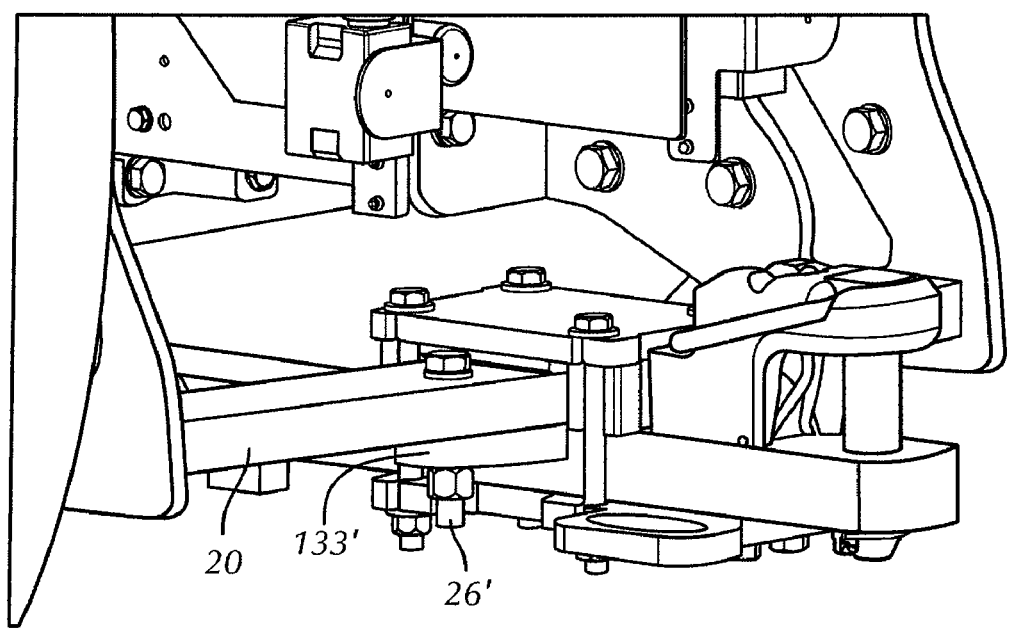
FIG. 8 is a close-up perspective view of an alternate, removable stop element configuration.

Referring to FIG. 7, preferably, stop members 133 are fixedly joined with pins 26, for example by being welded together, and the pins 26 passed upward through the openings 28 in the hanger bar and held in position by suitable removable means such as a "click" pin 26a or cotter pin or nut (neither depicted) depending on how the tops of the pins 26 are configured. Referring to FIG. 8, instead of welding, the stop members might be plates 133' sized larger than the depicted stop members 133 so as to be provided with a bore through which a fastener 26' such as an M-24 bolt is passed to selectively, yet removably join the stop member 133' with the hanger bar 20. In this way the original configuration of the drawbar is left unchanged so that it might have it full range of movement with the stop elements 133, 133' removed. Less desirably, separate stop members 133 could be welded to the sides of the drawbar and pins 26 removably dropped down through openings 28 in the hanger bar 20 to immobilize the drawbar (not depicted).

It is further understood, therefore, that this invention is not limited to the particular embodiments disclosed, but is intended to cover modifications within the spirit and scope of the present invention.

What is claimed is:

1. An assembly for retaining a drawbar on a hanger bar fixedly mounted to a tractor proximal a rear end of the tractor and extending in a generally lateral direction so as to have opposing, elongated, front and rear edges, the assembly comprising:
   a bottom capture plate configured to be applied to a bottom side of the drawbar extending beyond lateral sides of the drawbar and beyond the front and rear edges of the hanger bar overlying the drawbar;
   a top capture plate configured to be applied over the hanger bar overlying the drawbar and also sized to extend beyond lateral sides of the drawbar and beyond the front and rear edges of the hanger bar;
   at least four removable fasteners extending between the top and bottom capture plates to secure the top and bottom capture plates together spanning intersection of the draw bar and overlying hanger bar, the top and bottom capture plates being configured to receive two of the fasteners on each lateral side of the drawbar and two of the fasteners on either of the front and rear edges of the hanger bar; and
   first and second spacer blocks configured to be removably captured along the front and rear edges of the hanger bar between the top and bottom capture plates by separate pairs of the at least four fasteners, the spacer blocks having a height greater than a height of the hanger bar.

2. The assembly of claim 1 wherein the first and second spacer blocks are identical.

3. The assembly of claim 1 wherein at least one of the first and second spacer blocks is generally dog bone shaped with an elongated central body portion supporting two, generally flared longitudinal ends, each flared longitudinal end having an outer perimeter with a fastener receiving structure.

4. The assembly of claim 1 further comprising a first wear pad sized and configured to be captured between the top capture plate and the hanger bar by the at least four removable fasteners, the height of the spacer block being at least as great as a combined height of the hanger bar and any wear pads provided in the assembly between the drawbar and the top capture plate.

5. The assembly of claim 4 further comprising a second wear pad sized and configured to be captured between the draw bar and the hanger bar by the at least four removable fasteners.

6. A drawbar mounting on a tractor comprising:
   a drawbar pivotally supported from the tractor for lateral movement at a rear end of the tractor;
   a hanger bar fixed mounting to the tractor proximal the rear end overlying the drawbar, the hanger bar having opposing, elongated front and rear edges;
   a bottom capture plate applied to a bottom side of the drawbar extending beyond lateral sides of the drawbar and beyond the front and rear edges of the hanger bar overlying the drawbar at an intersection of the drawbar and the hanger bar;
   a top capture plate applied over the intersection of the drawbar and the hanger bar overlying the drawbar and also sized to extend beyond lateral sides of the drawbar and beyond the front and rear edges of the hanger bar;

at least four removable fasteners extending between the top and bottom capture plates to secure the top and bottom capture plates together spanning the intersection of the drawbar and overlying hanger bar, the top and bottom capture plates being receiving two of the fasteners on each lateral side of the drawbar and two of the fasteners on either of the front and rear edges of the hanger bar; and first and second spacer blocks removably captured along the front and rear edges of the hanger bar between the top and bottom capture plates by separate pairs of the at least four fasteners, the spacer blocks having a height greater than a height of the hanger bar.

7. The drawbar mounting of claim 6 further comprising a first wear pad removably captured between the top and bottom capture plates by the at least four fasteners and the first and second spacer blocks, the height of the spacer blocks being at least as great as a combined height of the hanger bar and any wear pads provided in the assembly between the drawbar and the top capture plate.

8. The drawbar of mounting claim 7 further comprising a second, separate wear pad removably captured between the top and bottom capture plates with the first wear pad by the at least four fasteners.

9. The drawbar mounting of claim 6 in combination with the tractor.

10. A method of retaining a drawbar pivotally mounted to a tractor on a hanger bar fixedly mounted to the tractor overlying the drawbar, the method comprising the steps of:

positioning top and bottom capture plates respectively over and under the overlapped drawbar and hanger bar at an intersection of the drawbar and hanger bar so as to overlap opposing front and rear edges of the hanger bar and lateral sides of the drawbar;

positioning first and second spacer blocks separately along the front and rear edges of the hanger bar between the top and bottom capture plates, the spacer blocks each having a height greater than a height of the hanger bar; and removably securing the top and bottom capture plates over and under the overlapped draw bar and hanger bar, respectively, and the first and spacer bars along the front and rear edges of the hanger bar with at least four fasteners extended between and through the top and bottom capture plates.

11. The method of claim 10 wherein the step of removably securing further comprises capturing at least a first wear pad between the top and bottom capture plates with the at least four fasteners and the first and second spacer blocks and the step of positioning first and second spacer blocks further comprises providing first and second spacer blocks each with a height at least as great as a combined height of the hanger bar and any wear pads provided between the drawbar and the top capture plate.

12. The method of claim 11 wherein the step of removably securing further comprises capturing at least a second, wear pad between the top and bottom capture plates with the at least four fasteners.

* * * * *